(12) United States Patent
Haas et al.

(10) Patent No.: US 12,188,517 B2
(45) Date of Patent: Jan. 7, 2025

(54) WHEEL BEARING ASSEMBLY

(71) Applicant: AKTIEBOLAGET SKF, Gothenburg (SE)

(72) Inventors: Roland Haas, Schweinfurt (DE); Ludwig Edelmann, Sulzthal (DE); Johannes Klaus Zang, Schweinfurt (DE); Dominic Namyslo, Schweinfurt (DE); Matthias Schuler, Stadtlauringen (DE); Padelis Katsaros, Schweinfurt (DE)

(73) Assignee: AKTIEBOLAGET SKF, Gothenburg (SE)

( * ) Notice: Subject to any disclaimer, the term of this patent is extended or adjusted under 35 U.S.C. 154(b) by 25 days.

(21) Appl. No.: 17/884,453

(22) Filed: Aug. 9, 2022

(65) Prior Publication Data

US 2023/0054280 A1    Feb. 23, 2023

(51) Int. Cl.
*F16C 19/38*    (2006.01)

(52) U.S. Cl.
CPC .......... *F16C 19/38* (2013.01); *F16C 2326/02* (2013.01)

(58) Field of Classification Search
CPC .... F16C 19/38; F16C 19/386; F16C 2326/02; B60B 27/0015; B60B 27/0021; B60B 35/18; B60B 35/121
See application file for complete search history.

(56) References Cited

U.S. PATENT DOCUMENTS

| 7,413,261 B2 * | 8/2008 | De Freitas | F16C 19/386 |
| | | | 301/124.1 |
| 2011/0264345 A1 * | 10/2011 | Heim | G01L 3/1471 |
| | | | 701/70 |
| 2016/0236510 A1 * | 8/2016 | Beck | F16C 35/077 |
| 2023/0050021 A1 * | 2/2023 | Augustsson | B60B 27/0078 |

FOREIGN PATENT DOCUMENTS

JP    2012192817 A  * 10/2012   ............ F16C 33/723

OTHER PUBLICATIONS

Machine Translation of JP-2012192817-A (Year: 2012).*

* cited by examiner

*Primary Examiner* — Alan B Waits
(74) *Attorney, Agent, or Firm* — J-TEK LAW PLLC; Scott T. Wakeman; Mark A. Ussai (57) ABSTRACT

A wheel bearing assembly, preferably for trucks, includes a wheel adapter and a bearing unit, which has at least one first bearing ring and one second bearing ring, and a drive element. The wheel adapter is configured to connect the first bearing ring to a wheel, the first bearing ring preferably having at least one threaded bore to interact with at least one corresponding attachment means, preferably a screw, in order to connect the wheel adapter and the drive element to the first bearing ring. At least one rotation-securing element is provided that is configured to secure the connection between the wheel adapter and/or the drive element and/or the first bearing ring and/or the attachment means against rotation.

17 Claims, 5 Drawing Sheets

WHEEL BEARING ASSEMBLY

CROSS-REFERENCE

This application claims priority to German patent application no. 102021209062.1 filed on Aug. 18, 2021, the entire contents of which are fully incorporated herein by reference.

BACKGROUND OF THE INVENTION

The present invention relates to a bearings, and more particularly to wheel bearing assemblies, especially for trucks.

In wheel bearing assemblies, particularly for trucks, it is known to use a bearing unit including at least one stationary bearing ring and one rotating bearing ring, the rotating bearing ring being generally connected to a drive shaft. The stationary bearing ring is usually disposed on an axle element, which is also stationary. Furthermore, it is known to provide a wheel adapter that is attached to the rotating bearing ring using an attachment means, such as, for example, a screw, and serves as a connecting element between the bearing ring and the wheel. A brake element and at least one wheel are then connected to the wheel adapter by means of a rim, which is usually manufactured from cast iron. In general, with this type of wheel bearing assembly, the drive shaft and/or of the brake element is connected to the rotating bearing ring or the wheel adapter by means of a plurality of threaded fasteners, such as a "circle" of screws or bolts.

Depending on the use of the vehicle and the loads arising at the connection between the wheel adapter and the bearing ring, it is not always possible to ensure that a torque transmission by friction-fit from the screw connection (axial preload) is sufficient over the entire service life, with the result that additional constructive solutions are needed to minimize the risk of locking of the drive shaft and/or of the brake element, and to increase operational reliability. In particular, it can be problematic when the drive torque and the brake torque is only transmitted from the axial screwing force via the friction force. If, due to smooth or worn surfaces and/or the setting behavior of the fastening, the axial force is reduced, then the friction force is also reduced. A clearance in the fit can thereby arise that inevitably leads to the coming-out or backing out of the screw connection, and may finally end with a dangerous brake failure and/or wheel misalignments.

SUMMARY OF THE INVENTION

It is therefore the object of the present invention to provide a wheel bearing assembly including an improved connecting of the drive shaft to the rotating bearing ring and/or the wheel adapter.

This object is achieved by a wheel bearing assembly for trucks, the wheel bearing assembly comprising a bearing unit having at least one first bearing ring and one second bearing ring, the at least one first bearing ring having a threaded bore. A wheel adapter is configured to connect the at least one first bearing ring to a wheel. The wheel bearing assembly also includes a drive element and at least one attachment means configured to interact with the threaded bore of the at least one first bearing ring in order to connect the wheel adapter and the drive element to the first bearing ring. Further, at least one rotation-securing element configured to secure the connection between the wheel adapter and/or the drive element and/or the first bearing ring and/or the attachment means against rotation.

More specifically, the first bearing ring is provided with a threaded bore configured to interact with at least one corresponding attachment means, in particular a screw, in order to connect the wheel adapter and the drive element to the first bearing ring. The drive element can in particular be a drive shaft.

The bearing unit can include a first bearing ring, a second bearing ring and a plurality of rolling elements that are disposed between the first and the second bearing ring. For example, the rolling elements may be tapered rollers, but may be any other appropriate type of rolling element, such as for example, balls, needles, cylindrical rollers, etc. Furthermore, the bearing unit can be a preassembled bearing unit. Alternatively, at least two individual bearings can also form the bearing unit. Furthermore, the second bearing ring can be connected to a stationary, hollow axle stub through which the axle stub passes. In particular, the wheel adapter can be manufactured from metal, for example, from cast iron.

In order to improve torque transmission from the drive element to the first bearing ring and/or the wheel adapter, at least one rotation-securing element is provided that is configured to secure the connection between the wheel adapter and/or the drive element and/or the first bearing ring and/or the attachment means against rotation. In particular, the rotation-securing element reduces play in the fit, i.e., reduces any relative movement between the connected members to eliminate backlash, and thus the risk of a coming-out or backing out of the screw connection. In particular, the at least one rotation-securing element can be configured to couple the first bearing ring and/or the drive element and/or the wheel adapter and/or the attachment means such that torque from the drive element onto the wheel adaptor and/or the first bearing ring, in particular in a radial direction and/or to rotation, is transmissible without play.

The at least one rotation-securing element is preferably configured to provide an interference fit and/or friction fit between the first bearing ring and/or the drive element and/or the wheel adapter and/or the attachment means. By providing a constructive interference fit and/or friction fit, it can be achieved that even with diminishing screw force and/or diminishing friction force, the freedom from play of the connection is permanently ensured. The risk of brake failure and/or wheel misalignments can thus be minimized or eliminated.

According to one preferred embodiment, the at least one rotation-securing element is configured as a radially acting securing means, in particular a screw or a pin, which is configured to interact with the attachment means, the wheel adapter, and/or the drive element or the first bearing ring. Any play in the screw connection can thereby be reduced or even eliminated.

According to a further preferred embodiment, the at least one rotation-securing element includes a centering means that is configured to center the wheel adapter on the first bearing ring and/or the drive element, and/or to center the attachment means on the wheel adapter. The centering means preferably includes a centering surface and/or a taper screw and/or a spherical cap screw and/or a fit screw and/or a fit sleeve. In particular, a rotation-securing element configured as centering means can ensure a play-free torque transmission, even when a screw connection is not performed correctly (e.g., improper screw installation).

Furthermore, the at least one rotation-securing element can be disposed on an end side and/or a radial outer surface of the first bearing ring and/or of the wheel adapter and/or of the drive element. Furthermore, the at least one rotation-securing element can be configured as a discrete element (e.g., an arcuate component) or as a continuously encircling element (e.g., an annular component). The region wherein the shape and/or friction fit is increased can thereby advantageously be increased.

According to a further preferred embodiment, the at least one rotation-securing element comprises a first part and a second part that are configured to interact, wherein the first and the second part are preferably configured complementary to each other. In this case, the first part of the rotation-securing element can be disposed on at least one first component of the wheel bearing assembly, for example, the first bearing ring, the drive element, or/and the wheel adapter, and the second part of the rotation-securing element can be disposed on at least one other component of the wheel bearing assembly. For example, the first part can be disposed on the wheel adapter and the second part can be disposed on the drive element and/or the first bearing ring. That is, it is also possible that the first part and/or the second part of the rotation-securing element extends over more than one component of the wheel bearing assembly. The first and second part of the at least one rotation-securing element preferably includes a gearing profile, a wave profile, preferably a flower pattern, and/or flattenings or "flats". An interference fit and/or friction fit between two components of the wheel bearing assembly can thereby be increased, whereby better torque transmission may be achieved.

Furthermore, the at least one rotation-securing element can be an interference element that is disposed in a region and/or space between the wheel adapter and the first bearing ring and/or the drive element and is configured to interact with the attachment means so that an interference fit arises between the wheel adapter and the first bearing ring and/or the drive element. In particular, the interference element can be deformed such that the element "molds" into the prescribed region and/or space and an interference fit thereby arises. Furthermore, the region and/or space can be a region and/or space that is present for construction reasons and/or is specifically configured to interact with the interference element.

According to a further preferred embodiment, the wheel bearing assembly includes a plurality of rotation-securing elements that are configured identically and/or differently, so that an improved torque transmission can advantageously be achieved.

Further advantages and advantageous embodiments are specified in the description, the drawings and the claims. Here in particular the combinations of features specified in the description and in the drawings are purely exemplary, so that the features can also be present individually or combined in other ways.

BRIEF DESCRIPTION OF THE SEVERAL VIEWS OF THE DRAWINGS

In the following the invention is described in more detail using the exemplary embodiments depicted in the drawings. The exemplary embodiments and the combinations shown in the exemplary embodiments are purely exemplary and are not intended to define the scope of the invention. This scope is defined solely by the pending claims.

DETAILED DESCRIPTION OF THE INVENTION

In the following, identical or functionally equivalent elements are designated by the same reference numbers.

FIGS. 1 to 10 each show schematic views of a wheel bearing assembly 1, in particular for trucks, according to various embodiments. Here each of the wheel bearing assemblies 1 shown comprises a bearing unit 2 that includes a first bearing ring 4, at least one second bearing ring 6, preferably two second bearing rings 6-1, 6-2, and a plurality of rolling elements 8 that are disposed between the first bearing ring 4 and the second bearing ring(s) 6-1, 6-2. Preferably, the first bearing ring 4 is an outer bearing ring and is disposed about the second or inner bearing ring 6. Furthermore, the respective wheel bearing assemblies 1 shown include a wheel adapter 10. The wheel adapter 10 is configured to connect the first bearing ring 4 to a wheel (not shown) and a brake element 12, preferably a brake disk. For this purpose, the first bearing ring 4 has at least one threaded bore 14 (FIGS. 2 to 5, 7, 8 and 10) that is configured to interact with an attachment means 16, such as, for example, a screw or other threaded fastener, in order to connect the wheel adapter 10 to the first bearing ring 4. Furthermore, the first bearing ring 4 is preferably configured as a rotating bearing ring, and the brake element 12 and the wheel adapter 10 define a rotating component. Each of the wheel bearing assemblies 1 shown further comprises an axle stub 18 defining the stationary component. Furthermore, the first bearing ring 4 is connected to a drive element 20 that extends through the axle stub 18 and is attached to the first bearing ring 4 using attachment means 16.

In order to improve torque transmission from the drive element 20 to the first bearing ring 4 and/or the wheel adapter 10, in each of the wheel bearing assemblies 1 shown, at least one rotation-securing element 22 is provided that is configured to secure the connection between the wheel adapter 10 and/or the drive element 20 and/or the first bearing ring 4 and/or the attachment means 16 against rotation. In other words, the at least one rotation-securing element 22 is configured to prevent relative rotation or displacement between at least two of the wheel adapter 10, the drive element 20, the first bearing ring 4 and the attachment means 16, such that torque is transmissible from the drive element 20 to the wheel adapter 10 and/or the first bearing ring 4 without relative displacement between the drive element 20 and the wheel adapter 10 or between the drive element 20 and the first bearing ring 4. Further, the one or more rotation-securing elements 22 that are shown in FIGS. 1 to 10 are preferably configured to provide an interference fit and/or friction fit between the first bearing ring 4 and/or the drive element 20 and/or the wheel adapter 10 and/or the attachment means 16.

Figure 1:
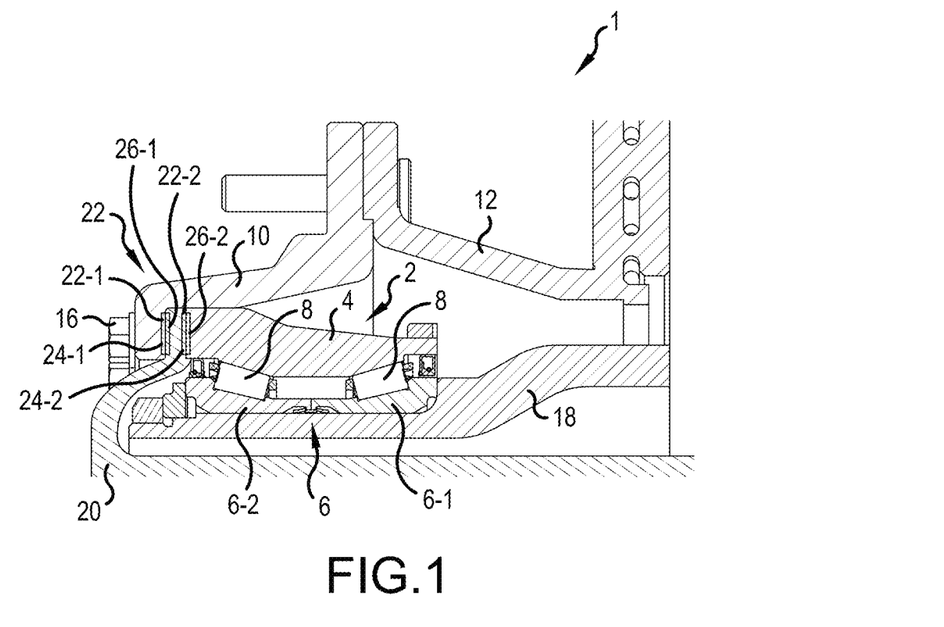
FIG. 1 shows a schematic sectional view of a wheel bearing assembly according to a first exemplary embodiment of the invention.

FIG. 1 shows a wheel bearing assembly 1 according to a first embodiment. The wheel bearing assembly 1 of FIG. 1 has a first rotation-securing element 22-1 and a second rotation-securing element 22-2. The first rotation-securing element 22-1 is configured to secure the connection between the wheel adapter 10 and the drive element 20 against rotation, and the second rotation-securing element 22-2 is configured to secure the connection between the drive element 20 and the first bearing ring 4 against rotation.

The first and second rotation-securing element 22-1, 22-2 each include a first part 24-1, 24-2, respectively, and a second part 26-1, 26-2, respectively, that are configured to interact. Here the first part 24-1 or 24-2 and the second part 26-1 and 26-2, respectively, are preferably configured complementary to each other and include, for example, a gearing profile, a wave profile, and/or another suitable profile. Furthermore, the first part 24-1 of the first rotation-securing element 22-1 is formed on an axially inner side of the wheel adapter 10, and the second part 26-1 of the rotation-securing element 22-1 is formed on an axially outer end side of the drive element 20. In addition, the first part 24-2 of the second rotation-securing element 22-2 is formed on an axial inner side of the drive element 20, and the second part 26-2 of the second rotation-securing element 22-2 is formed on an axial end side of the first bearing ring 4. Furthermore, the first and/or second rotation-securing element 22-1, 22-2 can be configured as a discrete element (e.g., an arcuate component) or as a continuously encircling element (e.g., an annular component). According to one variant (not depicted), only one rotation-securing element 22 can also be provided, which is provided, for example, between the drive element 20 and the wheel adapter 10. Alternatively, the one rotation-securing element 22 can also be provided between the drive element 20 and the first bearing ring 4.

Figure 2:
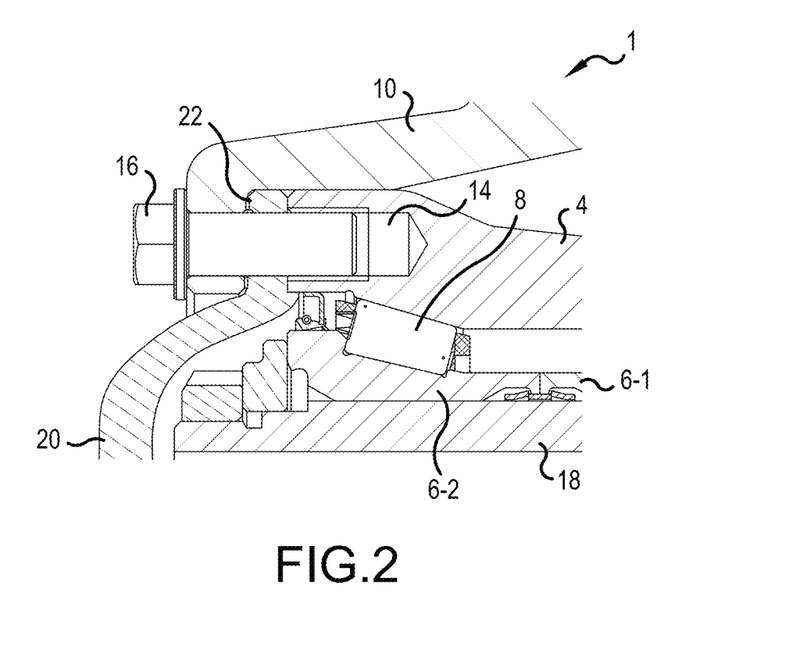
FIG. 2 shows a schematic sectional view of a wheel bearing assembly according to a second exemplary embodiment of the invention.

FIG. 2 shows a wheel bearing assembly 1 according to a second embodiment. In the wheel bearing assembly of FIG. 2, a rotation-securing element 22 is provided that is configured to increase a coefficient of friction of the corresponding surface. For this purpose, on an axially inner side of the wheel adapter 10 and/or on an axially outer end side of the drive element 20, for example, diamond dust is provided on the surfaces, so that during the screwing into or threaded engagement of the opposing surface, the diamond particles "dig in" and form a type of "mini interference fit."

Figure 3:
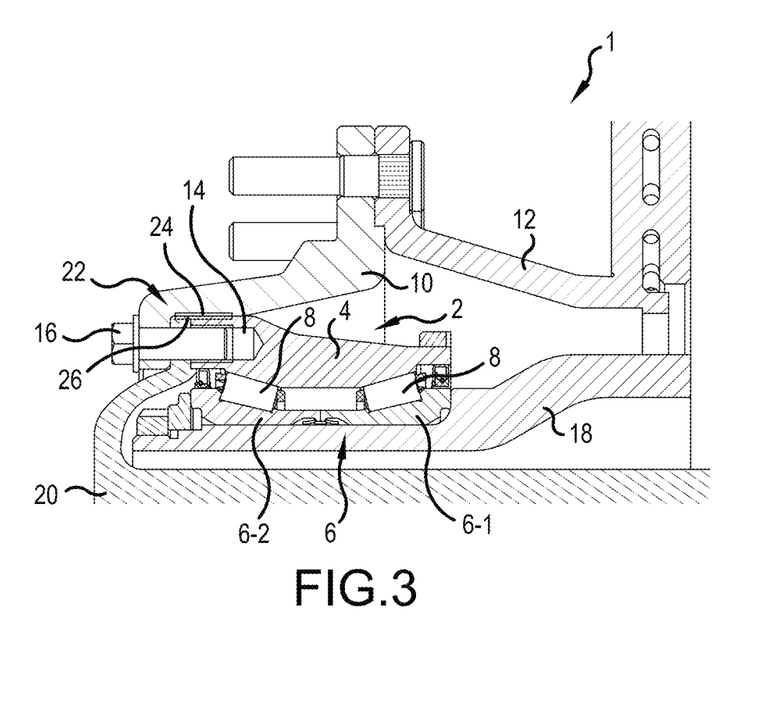
FIG. 3 shows a schematic sectional view of a wheel bearing assembly according to a third exemplary embodiment of the invention.

FIG. 3 shows a wheel bearing assembly 1 according to a third embodiment. The wheel bearing assembly 1 of FIG. 3 has a rotation-securing element 22, including a first part 24 that is disposed on a radially inner side of the wheel adapter 10 and a second part 26 that is disposed both on a radially outer side of the drive element 20 and on a radially outer side of the first bearing ring 4. The first and the second part 24, 26 can in turn be configured complementary to each other and include, for example, a gearing profile, a wave profile, or another suitable profile. Furthermore, the rotation-securing element 22 of FIG. 3 can be configured as a discrete element or as a continuously encircling element. According to a variant (not depicted), the second part 26 of the rotation-securing element 22 can be provided only on the drive element 20 or only on the first bearing ring 4.

FIGS. 4 to 8 show a wheel bearing assembly 1 according to a fourth fifth, sixth, seventh, and eighth embodiment, wherein the rotation-securing element 22 is respectively configured as a centering means that is configured to center the wheel adapter 10 on the first bearing ring 4 and/or the drive element 20 and/or to center the attachment means 16 on the wheel adapter 10.

Figure 4:
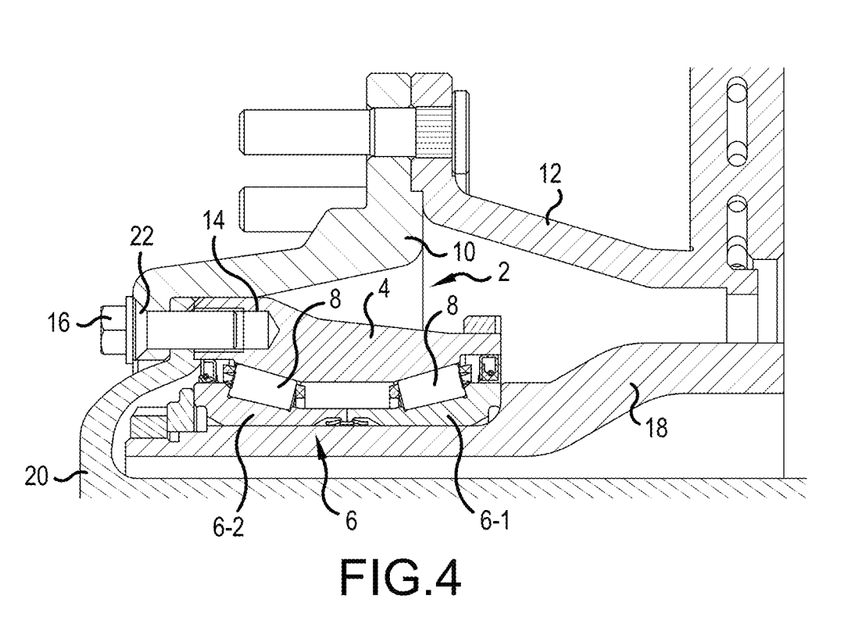
FIG. 4 shows a schematic sectional view of a wheel bearing assembly according to a fourth exemplary embodiment of the invention.
Figure 5:
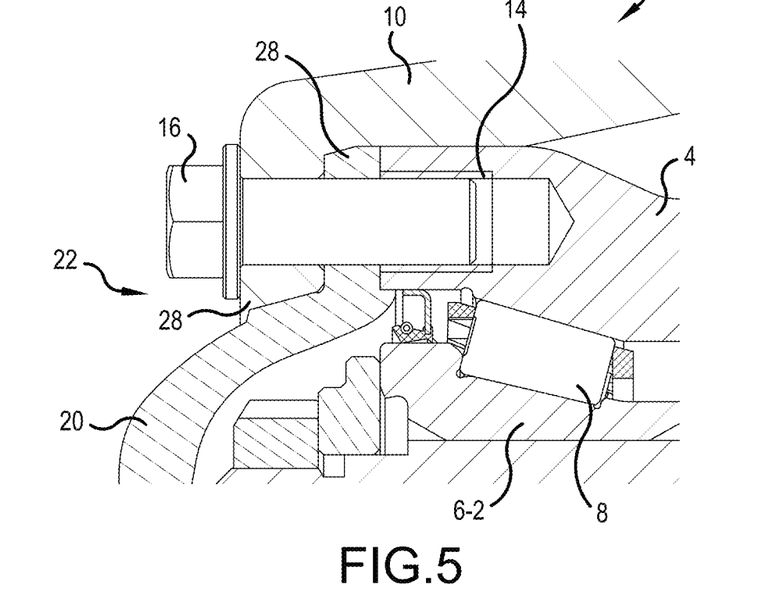
FIG. 5 shows a schematic sectional view of a wheel bearing assembly according to a fifth exemplary embodiment of the invention.

In FIG. 4, the rotation-securing element 22 is configured as a spherical cap screw. In FIG. 5, the rotation-securing element 22 is configured as centering surfaces 28 that have, for example, the shape of a cone surface (i.e., a conical surface) and are configured to center the wheel adapter 10 on the drive element 20. Additionally or alternatively, the drive element 20 can be centered on the first bearing ring 4 with the aid of a centering surface 28.

Figure 6:
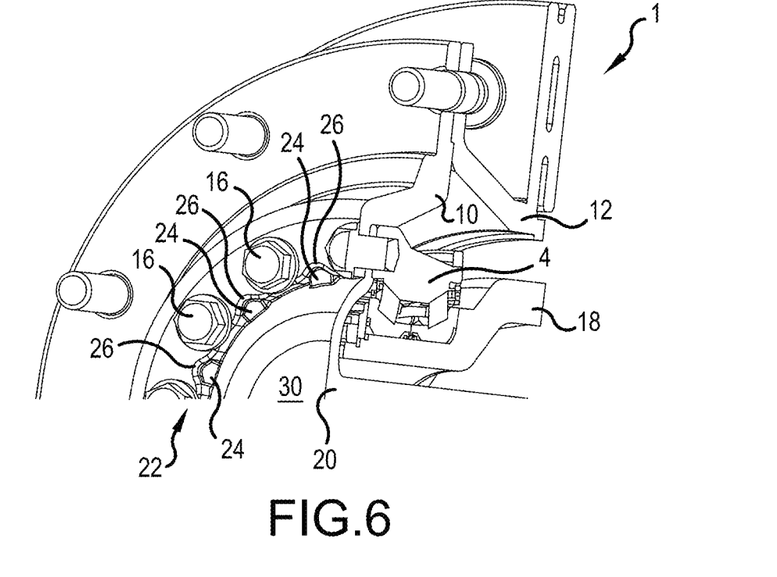
FIG. 6 shows a schematic perspective view of a wheel bearing assembly according to a sixth exemplary embodiment of the invention.

FIG. 6 shows a rotation-securing element 22 that has a first part 24 and a second part 26 that interact in order to center the wheel adapter 10 on the drive element 20. The first part 24 comprises a plurality of projections disposed on the end side 30 of the drive element 20, which projections interact with the second part 26 configured as corresponding openings or recesses which each receive one the projections of the first part 24.

Figure 7:
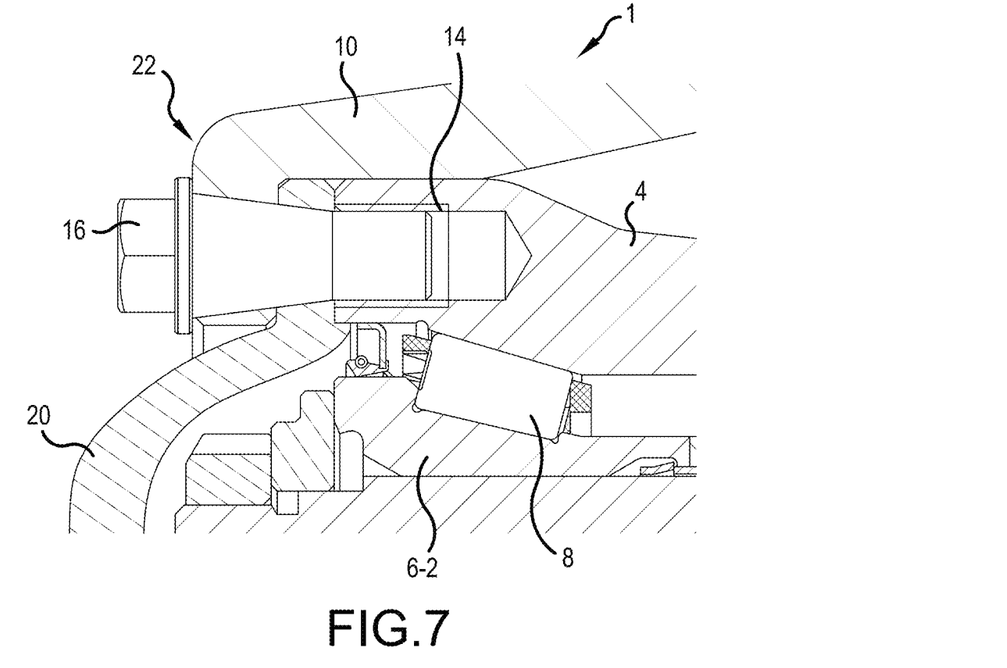
FIG. 7 shows a schematic sectional view of a wheel bearing assembly according to a seventh exemplary embodiment of the invention.
Figure 8:
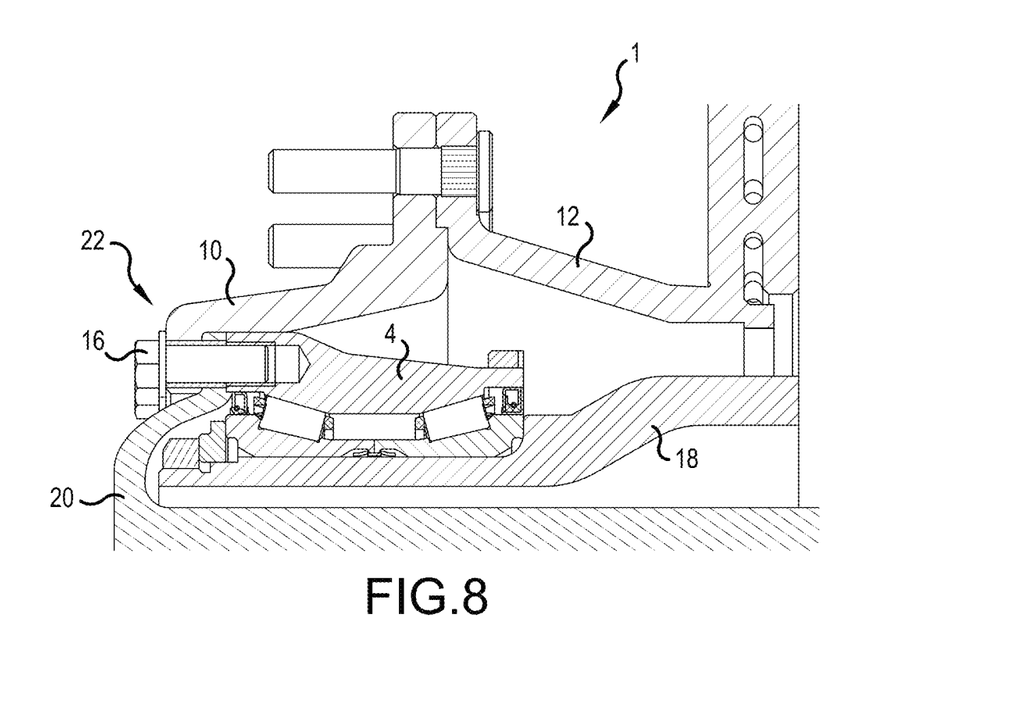
FIG. 8 shows a schematic sectional view of a wheel bearing assembly according to an eighth exemplary embodiment of the invention.

In FIG. 7, the rotation-securing element 22 is configured as a taper screw, and in FIG. 8 the rotation-securing element is configured as a fit screw. Alternatively or additionally, a fitting sleeve can also be used as the rotation-securing element 22.

Figure 9:
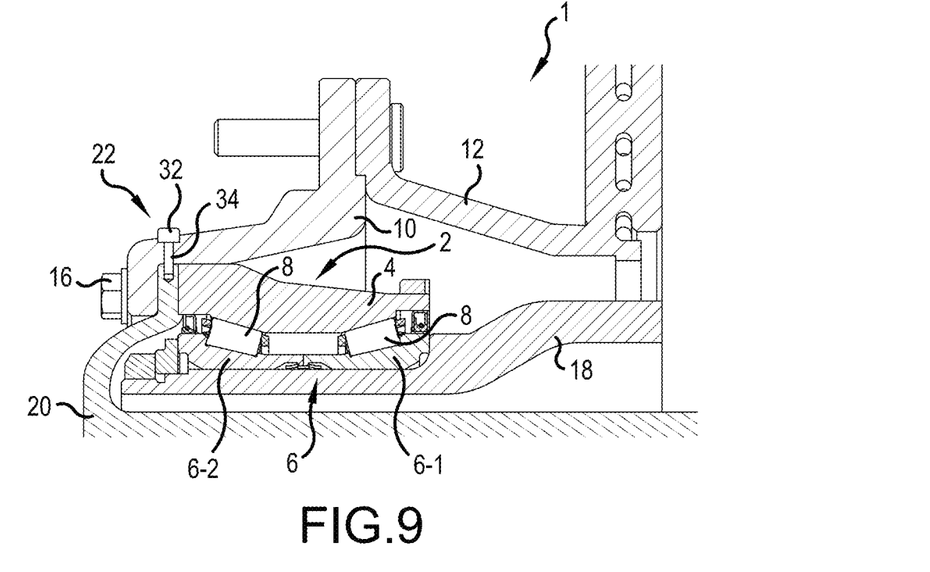
FIG. 9 shows a schematic sectional view of a wheel bearing assembly according to a ninth exemplary embodiment of the invention.

FIG. 9 shows a wheel bearing assembly 1 according to a ninth embodiment. The wheel bearing assembly of FIG. 9 has a rotation-securing element 22 that is configured as a radially acting securing means 32. The securing means 32 can be, for example, a screw or a pin. In FIG. 9, the securing means is inserted in a threaded bore 34 radially extending through the wheel adapter 10 and is configured to engage and to interact in the drive element 10. Alternatively or additionally, the securing means 32 can also interact with the attachment means 16 or the first bearing ring 4.

Figure 10:
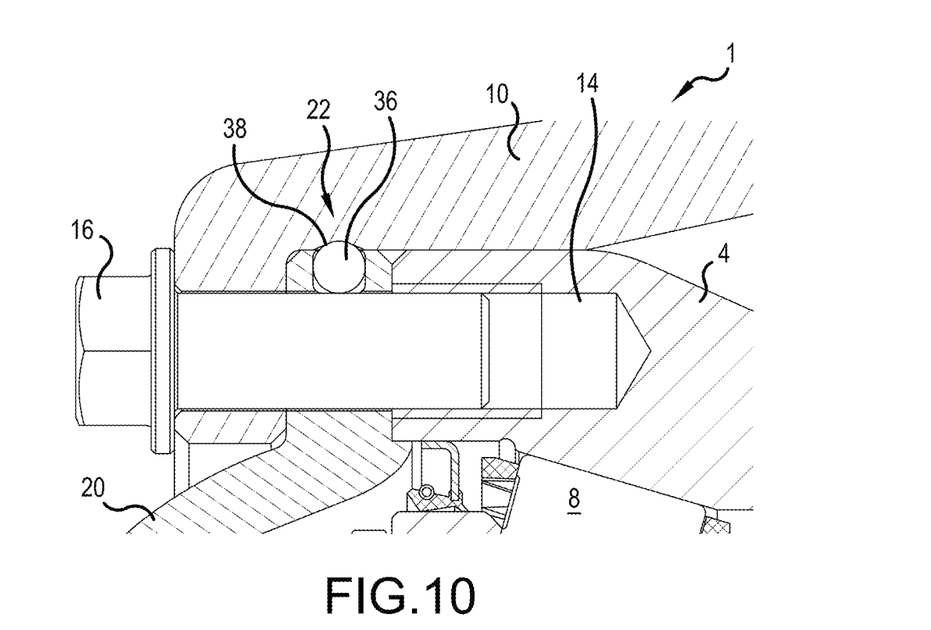
FIG. 10 shows a schematic sectional view of a wheel bearing assembly according to a tenth exemplary embodiment of the invention.

FIG. 10 shows a wheel bearing assembly 1 according to a tenth embodiment. The wheel bearing assembly of FIG. 10 has a rotation-securing element 22 that is configured as an interference element 36 that is disposed in a region between the wheel adapter 10 and the drive element 20 and is configured to interact with the attachment means 16 so that an interference fit arises between the wheel adapter 10 and the drive element 20. In particular, the interference element 36 can be configured such that it either displaces, as indicated in FIG. 10, when the attachment means 16 is introduced, and then engages with an opening 38 that is formed in the wheel adapter 10, or alternatively deforms such that the attachment means 36 "molds" into the prescribed region and/or space, and an interference fit thereby arises. Further, the interference element 36 can advantageously be configured such that the interference fit can also be released, in particular reversibly, by releasing of the attachment means 16. Furthermore, the region and/or space can be a region and/or space that is present for construction reasons and/or is specifically configured to interact with the interference element 36. Alternatively or additionally, the interference element 36 can be disposed in a region between the wheel adapter 10 and the first bearing ring 4 and can be configured to interact with the attachment means 16 so that an interference fit arises between the wheel adapter 10 and the first bearing ring 4.

Of course, the wheel bearing assembly 1 can advantageously include a plurality of rotation-securing elements 22 that are configured identically or differently, so that an improved torque transmission can advantageously be achieved.

In summary, due to the rotation-securing element 22, a play in the fit (e.g., relative movement between connected parts) and thus the risk of a "coming-out" of the screw connection (i.e., an uncoupling or disconnection) can be reduced. In particular, the at least one rotation-securing element 22 can be configured to couple the first bearing ring 4 and/or the drive element 20 and/or the wheel adapter 10 and/or the attachment means 16 such that a torque from the drive element 20 is transmissible in a play-free manner (e.g., without relative movement) to the wheel adapter 10 and/or the first bearing ring 4, in particular in a radial direction and/or to rotation. In this way, a play-free transmission of torque can be ensured even with an incorrectly carried out screwing process (e.g., an improper installation), and operating reliability of the wheel bearing assembly 1 can be significantly increased even in the case of an installation on a drive axle of a truck. Furthermore, due to the above-described wheel bearing assembly 1, a loss of drive torque within a short time may be prevented. Furthermore, with the wheel bearing assembly 1, it is also possible to transmit brake power even in the event of a screw release and to minimize the risk of a wheel misalignment.

Representative, non-limiting examples of the present invention were described above in detail with reference to the attached drawings. This detailed description is merely intended to teach a person of skill in the art further details for practicing preferred aspects of the present teachings and is not intended to limit the scope of the invention.

Moreover, combinations of features and steps disclosed in the above detailed description may not be necessary to practice the invention in the broadest sense, and are instead taught merely to particularly describe representative examples of the invention. Furthermore, various features of the above-described representative examples, as well as the various independent and dependent claims below, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter. The invention is not restricted to the above-described embodiments, and may be varied within the scope of the following claims.

REFERENCE NUMBER LIST

1 Wheel bearing assembly
2 Bearing unit
4 First bearing ring
6 Second bearing ring
8 Rolling element
10 Wheel adapter
12 Brake element
14 Threaded bore
16 Attachment means
18 Axle stub
20 Drive element
22 Rotation-securing element
24 First part
26 Second part
28 Centering surface
30 End side
32 Securing means
34 Threaded bore
36 Interference element
38 Opening

We claim:

1. A wheel bearing assembly for trucks, the wheel bearing assembly comprising:
a bearing unit having at least one first bearing ring and one second bearing ring, the at least one first bearing ring having at least one threaded bore;
a wheel adapter configured to connect the at least one first bearing ring to a wheel;
a drive element;
at least one attachment means configured to interact with the at least one threaded bore of the at least one first bearing ring in order to connect the wheel adapter and the drive element to the first bearing ring; and
at least one rotation-securing element disposed entirely axially between two of the wheel adapter, the drive element and the first bearing ring, or disposed radially between the wheel adapter and both of the drive element and the first bearing ring, or disposed around the attachment means, or formed as a conical surface on the at least one attachment means and mating conical surfaces formed in both of the wheel adapter and the drive element, or extending radially and at least partially through at least a portion of the wheel adapter and at least a portion of the drive element;
wherein the at least one rotation-securing element is configured to secure the connection between at least two of the wheel adapter, the drive element, the first bearing ring, and the attachment means against rotation;
wherein the at least one rotation-securing element is configured to provide an interference fit or a friction fit between two of the first bearing ring, the drive element, the wheel adapter, and the attachment means.

2. The wheel bearing assembly according to claim 1, wherein the at least one rotation-securing element is configured to couple at least two of the first bearing ring, the drive element, the wheel adapter, and the attachment means such that torque is transmissible in a play-free manner from the drive element to the wheel adapter and/or the first bearing ring.

3. The wheel bearing assembly according to claim 1, wherein the at least one rotation-securing element is configured as a radially-acting securing means configured to interact with at least one of the attachment means, the wheel adapter, the drive element, and the first bearing ring.

4. The wheel bearing assembly according to claim 3, wherein the at radially-acting securing means includes a screw or a pin.

5. The wheel bearing assembly according to claim 1, wherein the at least one rotation-securing element includes a centering means configured to center the wheel adapter on the first bearing ring and/or on the drive element, or configured to center the attachment means on the wheel adapter.

6. The wheel bearing assembly according to claim 5, wherein the centering means includes at least one of a centering surface, a taper screw, a spherical cap screw, a fitting screw, and a fitting sleeve.

7. The wheel bearing assembly according to claim 1, wherein the at least one rotation-securing element is disposed on an end side or a radial outer surface of at least one of the first bearing ring, the wheel adapter, and the drive element.

8. The wheel bearing assembly according to claim 1, wherein the at least one rotation-securing element is configured as a discrete element or as a continuously encircling element.

9. The wheel bearing assembly according to one claim 1, wherein the at least one rotation-securing element includes a first part and a second part, each one of the first part and the second part being configured to interact with the other one of the first part and the second part.

10. The wheel bearing assembly according to claim 9, wherein the first part and the second part of the at least one rotation-securing element are configured complementary to each other.

11. The wheel bearing assembly according to claim 10, wherein the first part and second part of the at least one rotation-securing element each includes a gearing profile, a wave profile, or flattenings.

12. The wheel bearing assembly according to claim 1, wherein the at least one rotation-securing element is an interference element that is disposed in a region between the wheel adapter and the first bearing ring or the drive element and is configured to interact with the attachment means so that an interference fit is formed between the wheel adapter and the first bearing ring or between the wheel adapter and the drive element.

13. The wheel bearing assembly according to claim 1, wherein the wheel bearing assembly includes a plurality of rotation-securing elements that are formed identically or differently.

14. A wheel bearing assembly for trucks, the wheel bearing assembly comprising:
 a bearing unit having a first bearing ring and a second bearing ring, the first bearing ring having at least one threaded bore;
 a wheel adapter configured to connect the first bearing ring to a wheel;
 a drive element;
 at least one attachment means configured to engage with the at least one threaded bore of the first bearing ring to connect the wheel adapter and the drive element to the first bearing ring; and
 at least one rotation-securing element disposed entirely axially between two of the wheel adapter, the drive element and the first bearing ring, or disposed radially between the wheel adapter and both of the drive element and the first bearing ring, or disposed around the attachment means, or formed as a conical surface on the at least one attachment means and mating conical surfaces formed in both of the wheel adapter and the drive element, or extending radially and at least partially through at least a portion of the wheel adapter and at least a portion of the drive element;
 wherein the at least one rotation-securing element is configured to prevent relative rotation between at least two of the wheel adapter, the drive element, the first bearing ring and the attachment means;
 wherein the at least one rotation-securing element is configured to provide an interference fit or a friction fit between the first bearing ring and at least one of the drive element, the wheel adapter and the attachment means.

15. The wheel bearing assembly according to claim 14, wherein the at least one rotation-securing element is configured to couple the first bearing ring and/or the drive element and/or the wheel adapter and/or the attachment means such that torque is transmissible from the drive element to the wheel adapter and/or the first bearing ring without relative displacement between the drive element and the wheel adapter or between the drive element and the first bearing ring.

16. The wheel bearing assembly according to claim 14, wherein the at least one rotation-securing element:
 is configured as a radially-acting securing means configured to interact with at least one of the attachment means, the wheel adapter, the drive element, and the first bearing ring; or
 includes a centering means configured to center the wheel adapter on the first bearing ring or the drive element, or configured to center the attachment means on the wheel adapter; or
 is disposed on an end side or a radial outer surface of at least one of the first bearing ring, the wheel adapter, and the drive element.

17. The wheel bearing assembly according to one claim 14, wherein the at least one rotation-securing element includes a first part and a second part, each one of the first part and the second part being configured to interact with the other one of the first part and the second part.

* * * * *